United States Patent [19]

Dhuey

[11] Patent Number: 4,926,314
[45] Date of Patent: May 15, 1990

[54] METHOD AND APPARATUS FOR DETERMINING AVAILABLE MEMORY SIZE

[75] Inventor: Michael Dhuey, Cupertino, Calif.
[73] Assignee: Apple Computer, Inc., Cupertino, Calif.
[21] Appl. No.: 48,362
[22] Filed: May 11, 1987

Related U.S. Application Data

[63] Continuation-in-part of Ser. No. 27,005, Mar. 17, 1987, abandoned.
[51] Int. Cl.$^5$ .................. G06F 13/06; G06F 12/14; G06F 9/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| Re. 31,318 | 7/1983 | Kaufman et al. | 364/200 |
| 4,281,392 | 7/1981 | Grants et al. | 364/900 |
| 4,340,932 | 7/1982 | Bakula et al. | 364/200 |
| 4,368,515 | 1/1983 | Nielsen | 364/200 |
| 4,382,179 | 5/1983 | Penton | 377/20 |
| 4,468,729 | 8/1984 | Schwartz | 364/200 |
| 4,473,877 | 9/1984 | Tulk | 364/200 |
| 4,503,491 | 3/1985 | Lushtak et al. | 364/200 |
| 4,507,730 | 3/1985 | Johnson et al. | 364/200 |
| 4,513,374 | 4/1985 | Hooks, Jr. | 364/200 |
| 4,601,018 | 7/1986 | Baum et al. | 365/189 |
| 4,679,167 | 7/1987 | Finnell | 364/900 |
| 4,787,060 | 11/1988 | Boudreau et al. | 364/200 |

FOREIGN PATENT DOCUMENTS

| | | |
|---|---|---|
| 0080626 | 6/1983 | European Pat. Off. . |
| 0136178 | 4/1985 | European Pat. Off. . |
| 0200198 | 11/1986 | European Pat. Off. . |
| 1430486 | 3/1976 | United Kingdom . |
| 2101370A | 1/1983 | United Kingdom . |
| 2175716A | 12/1986 | United Kingdom . |

OTHER PUBLICATIONS

Robert C. Goldblatt, How Computers Can Test Their Own Memories, Computer Design, vol. 15, No. 7, pp. 69–73 (07/76).

*Primary Examiner*—Andrew J. James
*Assistant Examiner*—Viet Q. Nguyen
*Attorney, Agent, or Firm*—Blakely, Sokoloff, Taylor & Zafman

[57] ABSTRACT

The present invention provides an apparatus and method for use in a computer system, and particularly, a computer system employing memory devices having discrete capacity (i.e., 256K bit, 1M bit, etc.), such as random access memory (RAM). The present invention includes a central processing unit (CPU) coupled through a multiplexor to a plurality of contiguous banks of memory devices. In a typical embodiment, a user inserts a desired number of RAM memory devices having a particular memory capacity into the memory banks. A maximum memory address is defined for each bank as the address which would exist if the highest capacity memory devices available were utilized (e.g., 16M bit/device). On power-up, the CPU sequentially attempts to store the numerical address value of each possible memory address at that address location, from the highest possible contiguous address to the lowest, for the first memory bank. In the event that the CPU attempts to write to a non-existent address, the value is automatically stored at the highest read address in the system. The CPU then sequentially reads each possible memory address from the lowest to the highest. For each address read, the CPU compares the stored value with the address. The fact that the stored value equals the address indicates that the address exists. In the event the stored value does not equal the address, but rather equals the previously read address, the address does not exist and the highest available memory is set to the previous address value. The CPU repeats this procedure for the next bank of memory until the total available memory of the system is determined. A bit value is assigned which corresponds to the available memory size of the first memory bank. This bit value is stored in a register coupled to control logic which controls the operation of the multiplexor and generates row address (RAS) and column address (CAS) signals to access the memory. Memory banks are selected by the control logic based upon the logical state of predetermined address bits outputted by the CPU which are identified by the bit value.

17 Claims, 4 Drawing Sheets

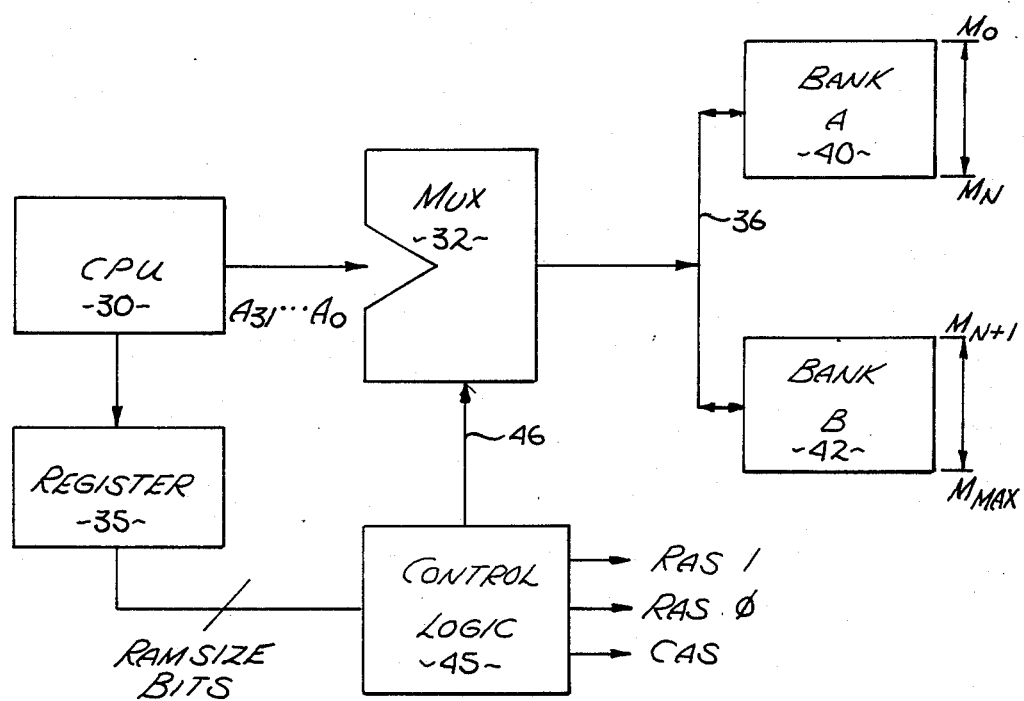
Fig. 5
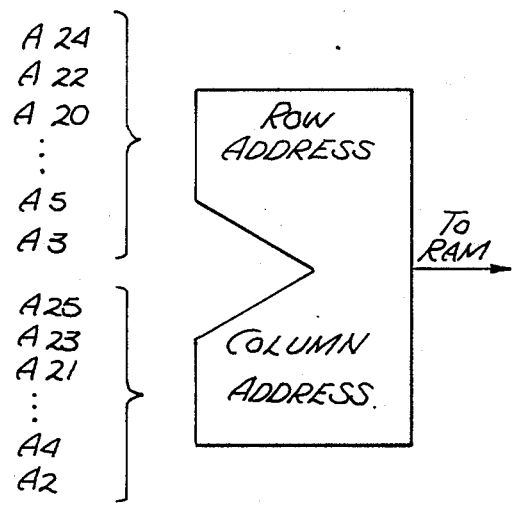
Fig. 6
| RAM SIZE BITS | | DEVICE | MEM. SIZE | ADD BIT |
|---|---|---|---|---|
| 0 | 0 | 256K BIT | 1 MB | $A_{20}$ |
| 0 | 1 | 1M BIT | 4 MB | $A_{22}$ |
| 1 | 0 | 4 MBIT | 16 MB | $A_{24}$ |
| 1 | 1 | 16 MBIT | 64 MB | $A_{26}$ |
Fig. 7

METHOD AND APPARATUS FOR DETERMINING AVAILABLE MEMORY SIZE

This Application is a continuation-in-part of U.S. Pat. application, Ser. No. 027,005, filed 3/17, 1987, and assigned to the Assignee of the present Application.

BACKGROUND OF THE INVENTION

1. Field of the Invention

The present invention relates to apparatus and methods for determining the size of available memory in a computer system. More particularly, the present invention relates to a method for automatically determining memory size in a computer system in which a user may selectively remove and add memory devices.

2. Prior Art

In the computing industry, it is quite common for a central processing unit (CPU) to be coupled to memory devices, such as for example, dynamic random access memory (DRAM). The DRAM memory (like all semiconductor memory devices) identifies specific storage locations of data with a unique address. The more memory which is available to the CPU, the higher the addresses available to access data within the memory devices. In many computer systems, such as personal computers (PCs), a user may increase the amount of available memory by adding discrete memory devices, such as 256K bit, 1M bit, etc. memory chips.

In those computer systems which permit a user to increase the amount of available memory, it is necessary to identify the total available memory address space in order to permit the CPU to access all of the data locations in the now expanded memory. Historically, the memory size of the system was identified to the CPU through the use of jumper wires on the main printed circuit board, or dual in-line package (DIP) switches located adjacent to the memory on the printed circuit board. If a user incorrectly sets the available memory size in the computer system higher than it actually is, the CPU will overwrite data stored at these non-existant higher addresses into the highest real address which exists in the memory system. This feature is commonly referred to as memory "wrap around". Accordingly, errors may result, data loss, and overall system efficiency sacrificed through improper setting of the DIP switches or jumper wires on the printed circuit board, since the CPU will operate under conditions of improper memory address space allocation.

As will be described more fully below, the present invention provides a method and apparatus which permits the CPU to determine the true memory size available to it without the necessity of the user flipping switches, jumpers, or other hardware to set the available memory size in the system.

SUMMARY OF THE INVENTION

The present invention provides apparatus and methods for use in a computer system, and particularly, a computer system employing memory devices having discrete capacity (i.e., 256K bit, 1M bit, etc.), such as random access memory (RAM). The present invention includes a central processing unit (CPU) coupled through a multiplexor to a plurality of contiguous banks of memory devices. In a typical embodiment, a user inserts a desired number of RAM memory devices having a particular memory capacity into the memory banks. A maximum memory address is defined for each bank as the address which would exist if the highest capacity memory devices available were utilized (e.g., 16M bit/device). On power-up, the CPU sequentially attempts to store the numerical address value of each possible memory address at that address location, from the highest possible contiguous address to the lowest, for the first memory bank. In the event that the CPU attempts to write to a non-existent address, the value is automatically stored at the highest real address in the system. The CPU then sequentially reads each possible memory address from the lowest to the highest. For each address read, the CPU compares the stored value with the address. The fact that the stored value equals the address indicates that the address exists. In the event the stored value does not equal the address, but rather equals the previously read address, the address does not exist and the highest available memory is set to the previous address value. The CPU repeats this procedure for the next bank of memory until the total available memory of the system is determined. A bit value is assigned which corresponds to the available memory size of the first memory bank. This bit value is stored in a register coupled to control logic which controls the operation of the multiplexor and generates row address (RAS) and column address (CAS) signals to access the memory. Memory banks are selected by the control logic based upon the logical state of predetermined address bits outputted by the CPU which are identified by the bit value.

BRIEF DESCRIPTION OF THE DRAWINGS

FIG. 5 illustrates a more detailed block diagram of a system incorporating the teachings of the present invention.

FIG. 6 symbolically illustrates the operation of the multiplexor shown in FIG. 5.

FIG. 7 illustrates the present invention's use of RAM-SIZE bits to represent the size of available memory in bank A of the memory in the system of FIG. 5.

NOTATION AND NOMENCLATUARE

Figure 1:
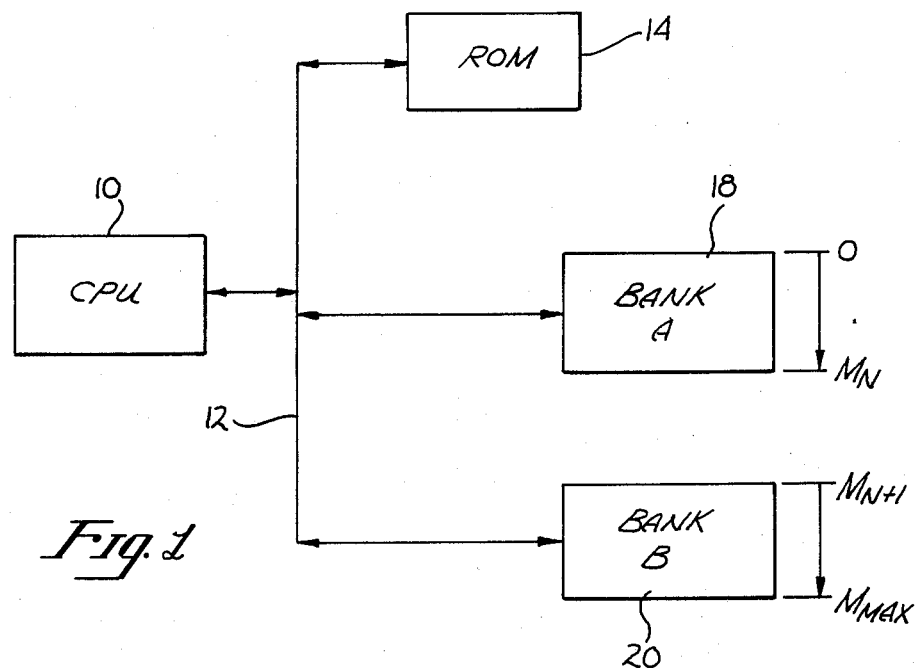
FIG. 1 illustrates a block diagram of a computer system incorporating the teachings of the present invention.

The detailed description which follows is presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities. Further, the manipulations performed are also referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, the distinction between the method operations and operating a computer and the method of computation itself should be noted. The present invention relates to method steps for operating the computer and processing electrical or other (e.g. mechanical, chemical) physical signals to generate other desired physical signals.

The present invention also relates to apparatus for performing these operations. This apparatus may be specially constructed for the required purposes or it may comprise a general computer as selectively activated or reconfigured by a computer program stored in the computer. The algorithms presented herein are not inherently related to any particular computer or other apparatus. In particular, various general purpose machines may be used with the teachings herein, or it may prove more convenient to construct more specialized apparatus to perform the required method steps. The required structure for a variety of these machines will appear from the description given below.

DETAILED DESCRIPTION OF THE INVENTION

The present invention provides apparatus and methods for use in a computer system employing memory devices having discrete capacity, such as random access memory (RAM), to automatically determine the amount of available memory in the system. In the following description for purposes of explanation, specific architectures, block diagram layouts, memory devices, memory device capacities, etc. are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

Referring now to FIG. 1, one possible configuration of hardware which may utilize the teachings of the present invention is disclosed. As illustrated, a CPU 10 is coupled to a bus 12 for communication with a variety of data processing devices, including a Read-Only-Memory (ROM) 14. As is well known, ROM 14 contains preprogrammed operations, data, etc. which is available for execution and access by CPU 10. CPU 10 may also utilize Random-Access-Memory (RAM) situated in one or more memory banks, such as for example Bank A and Bank B of FIG. 1. Each bank of memory is comprised of a plurality of memory devices having a specific memory capacity. For example, Bank A may be comprised of RAM chips having 256K bit or one megabit of memory, which are currently on the market. In practice, a user inserts the memory devices into sockets on a printed circuit board comprising memory Bank A. Similarly, Bank B is comprised of a plurality of memory devices having a particular capacity. In prior art systems, it was necessary for a user to set hardware or software switches, or physical jumper wires, in the computer system to notify the CPU of the RAM memory size which is available in the system. In the event a user replaced, for example, 256K memory devices with one megabit devices, the system would be unable to utilize this enhanced memory capacity without hardware modifications to the physical structure of the circuit. The requirement that a user set switches for modified jumpers proves inconvenient, and, if done improperly, may result in data loss, inefficiency, or possible system failure. As will be described below, the present invention permits a user to add or substract memory devices from the system without the necessity of physically reconfiguring the hardware to notify CPU 10 of the amount of memory available.

As illustrated in FIG. 1, CPU 10 is coupled through bus 12 to RAM Bank A (18) and RAM Bank B (20). RAM Bank A is comprised of a plurality of RAM memory devices, wherein each possible storage location for the memory bank is defined by a unique address from $M_0$ through $M_N$. The address locations $M_0$ through $M_N$ are contiguous and sequential. Similarly, RAM Bank B is comprised of a plurality of memory devices with possible addresses $M_{N+1}$ through $M_{Max}$, and therefore, it is possible in the system of the present invention for the available memory addresses to run contiguously from $M_0$ through $M_{Max}$. However, in the event that maximum memory is not utilized RAM Bank B may be only partially filled, such that the highest address is less than $M_{Max}$, but greater than $M_{N+1}$. Similarly, it is conceivable that RAM Bank A may only be partially filled and RAM Bank B completely empty. Due to the limitation that the memory addresses be contiguous, the presently preferred embodiment would not permit a partially filled Bank A and partially filled Bank B, although the methods and apparatus of the present invention could, with modification, accomodate such a memory scheme. In addition, the present invention, as illustrated in FIG. 1, has the attribute, as do most computer systems, that any attempt to store data at a address which does not physically relate to a real storage location will result in the data being stored in the highest real physical address. This "wrap around" occurs since a system error would result through any attempt to store data at a non-existent address.

Currently, dynamic RAM memory devices are available commercially in certain fixed memory capacities. For example, devices are available in 256K or 1 Megabit capacities for most personal computer systems on the market. It is anticipated that by the year 1990, 4 Megabit RAM density devices will be available, and possibly by the year 1993, 16 Megabit devices will be provided in commercial quantities. As will be described more fully below, the present invention's methods and operations may be optimized by the fact that RAM densities are provided in increments of 256K, 1 Megabit, 4 Megabit and 16 Megabit, as opposed to odd densities. In addition, for purposes of the presently preferred embodiment, the present invention is designed to accept $\neq$Megabit memory devices as the largest devices which may be utilized, under the assumption that these devices will be available in the future. However, it will be appreciated that although the presently preferred embodiment is designed to accept a maximum of 16 Mbit devices, that the present invention may be utilized using a variety of devices of various capacities.

Figure 2:
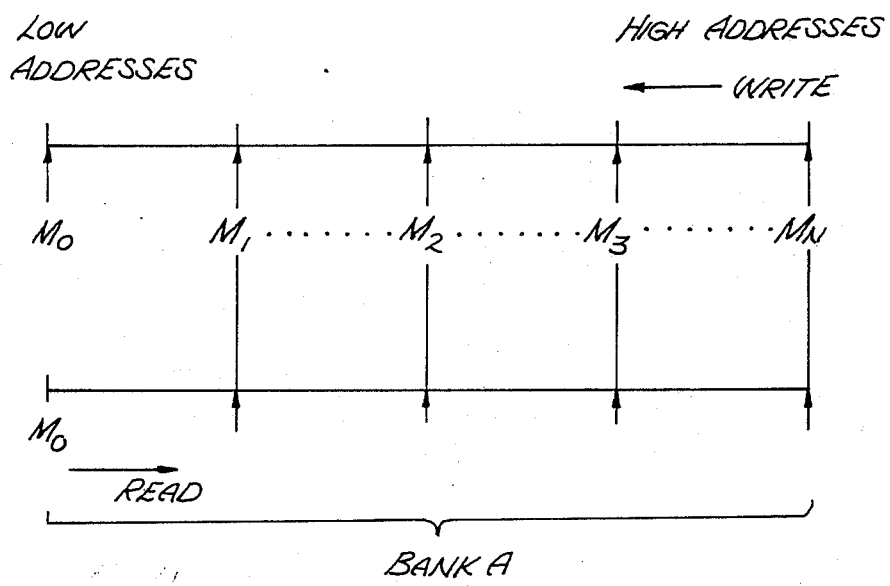
FIG. 2 illustrates, in conceptual form, the operation of the present invention to determine available memory size in a computer system.

Referring to FIG. 2, the conceptual operation of the present invention will be disclosed. The variable "N" is defined as the total number of "binary increments" comprising boundary points within each memory bank. For example, if 256K memory devices are used in the system, then the boundary points defining the beginning and end of the total possible memory available fall on 256K increments. It will be appreciated by one skilled in the art, that to determine whether or not a particular memory device is coupled to RAM Bank A or B of FIG. 1, it is only necessary to test at these binary boundary increments (i.e., 256K), and not each storage location within all of the memory devices. In FIG. 2, for purposes of illustration, the binary boundary increments for Bank A are identified as $M_0$, $M_1$, $M_3$, and $M_N$. Upon power up, CPU 10 attempts to store, beginning at the highest possible address increment for the Bank ($M_N$) through to the lowest address increment ($M_0$) the address of each binary increment for storage at that location. In other words, CPU 10 attempts to sequentially store the address of the particular memory location at that memory location, and begins from the highest address to the lowest incremental address. It will be apparent to one skilled in the art, that although the present invention has optimized and increased the efficiency of the system through the use of testing only at the binary increments ($M_0$, $M_1$, etc.), that the methods, apparatus and operations of the present invention are equally applicable to those computer systems in which each storage location within the memory, or other predefined increments, are used in place of increments $M_0$ through $M_N$ as disclosed.

Figure 3:
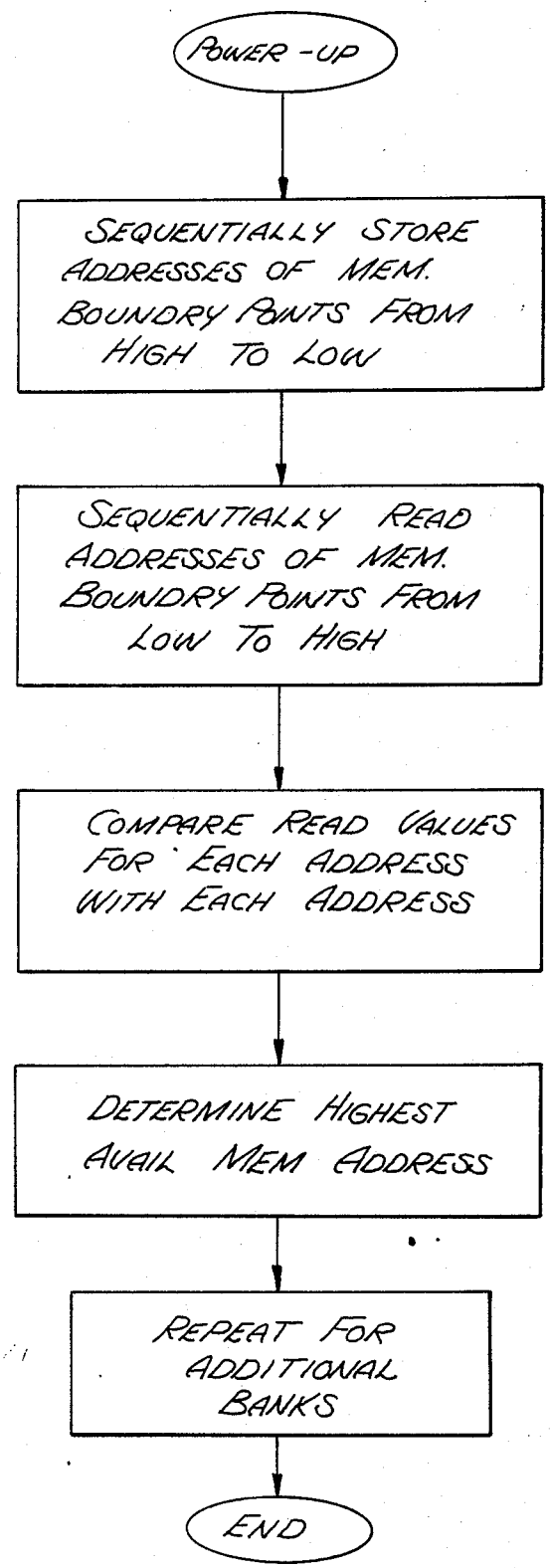
FIG. 3 symbolically illustrates the overall sequence of operations of the present invention as executed by the CPU.

With reference to FIGS. 2 and 3, once CPU 10 has sequentially stored the addresses of the memory boundary points, the CPU then begins to sequentially read the addresses at the increment boundary points from low ($M_0$) to high address ($M_N$). At each address read, CPU 10 compares the contents of the storage location at the address with the address it has read. If the stored contents are equivalent to the address read, it will be appreciated that this indicates that the memory address constitutes a real physical storage location within the computer system. CPU 10 continues to sequentially read and compare the contents of the stored values for each binary increment (N) and compares each value to the respective address. In the event that the stored value of each binary increment equals the address throughout the memory bank (for example Bank A) this indicates that the memory is filled to its maximum capacity and that continguous available memory locations exist from address $M_0$ through address $M_N$.

In the event that a stored value does not equal the address value at a particular binary increment, it will be appreciated that the RAM memory is less than the maximum capacity, and in fact, the highest real address is equal to the memory address at the previous binary increment. It will be recalled, that due to the memory "wrap around" feature of the present invention (a feature present in virtually all computer systems) any attempt to write data to a non-existent address results in the data being stored at the last (highest) real physical address location of the system. For example, assume that the contents of $M_2$ (see FIG. 2) are compared with the address and are found to be equivalent. If CPU 10 sequentially increments to memory address location $M_3$ and determines that the contents of $M_3$ are equal to the contents of $M_2$, they are not equal to the address of $M_3$. Due to memory wrap around, an attempt to read a non-existent address (such as $M_3$) results in the retrieval of data at the last highest real address in existence ($M_2$). Since CPU 10 had written the address locations as data, for each address location from the highest address to the lowest, address location $M_2$ would contain the value of the address $M_2$, as opposed to the value of $M_3$. The reading of a non-existent address such as $M_3$, results in retrieval of the value stored at $M_2$. Since memory devices are commercially manufactured having finite known capacities (i.e., 256K bit, 1M bit, etc.) CPU 10 may then set the maximum contiguous real address at $M_2$ at the last real binary increment detected.

Once the memory capacity of Bank A is determined using the above-described method, CPU 10 follows a similar procedure with respect to determining the amount of memory in RAM Bank B. In the case of RAM Bank B, the lowest address value is $M_{N+1}$, with the highest address being $M_{Max}$, with a total number of binary increments (N) for the bank.

Figure 4:
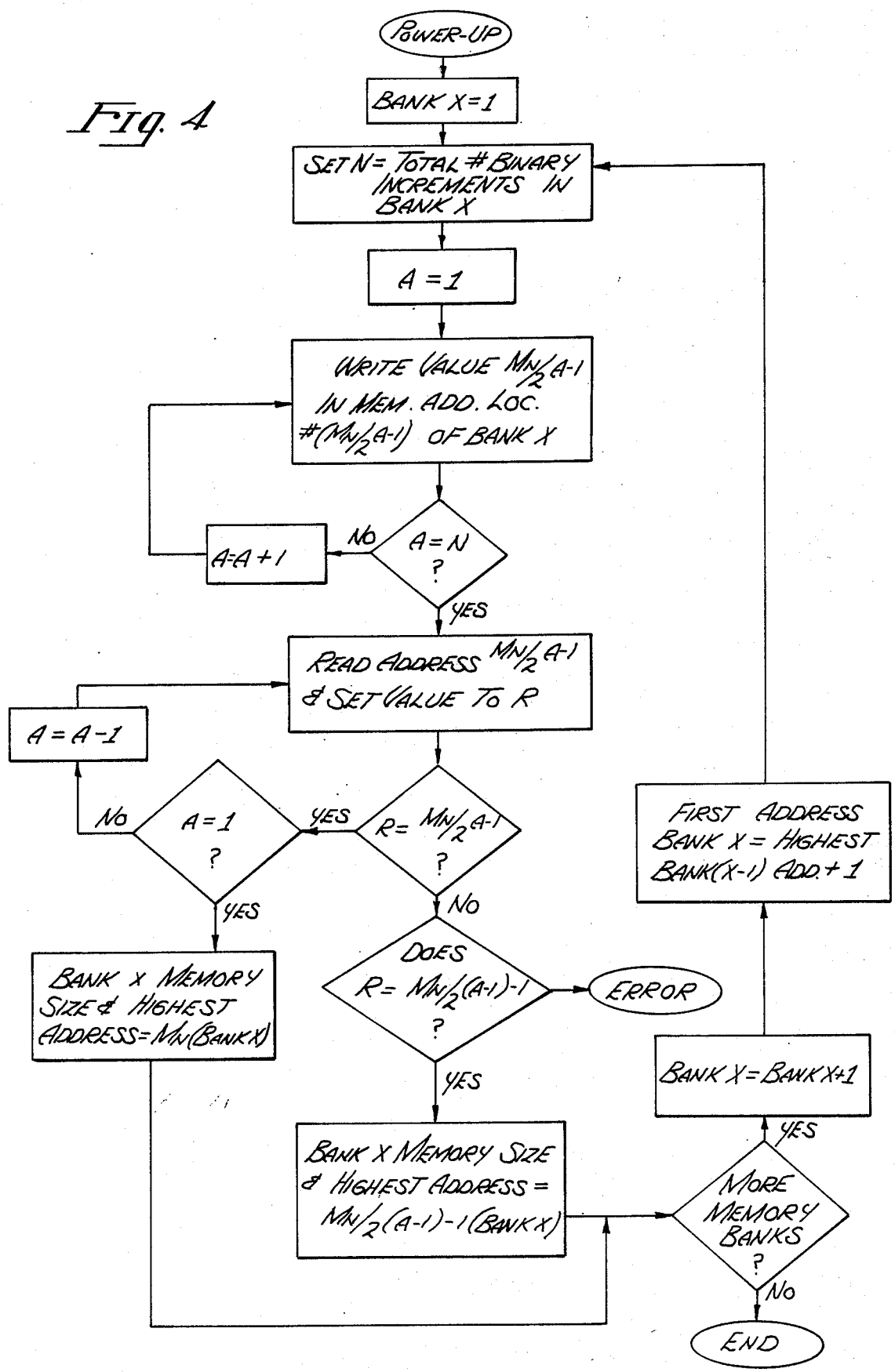
FIG. 4 is a more detailed flow chart illustrating the sequence of operations of the present invention described herein.

FIG. 4 illustrates, in a more detailed fashion, the sequence of operations executed by CPU 10 in determining the size of memory banks coupled to bus 12. As illustrated, upon power up of the system CPU 10 determines the size of the available memory in the first bank, and sets a variable (N) as the total number of binary increments in the first bank (X). As previously described, although the present invention will function by sequentially writing and reading each possible address in a memory disposed in one of the memory banks illustrated in FIG. 1, it has been found that by using discrete binary increments (i.e., 256K) the method of the present invention performs faster and more efficiently. Since memory devices are not commercially marketed in odd sizes (for example 300K memory devices), it is known that a user will fill memory banks utilized by the present invention in finite, discrete and known increments.

Once the total number of binary increments is set for the bank as variable N, CPU 10 writes the value of each address, commencing from the higher increment to the lowest increment, of $M_N/2^{A-1}$ where in FIG. 4 and in the equation $M_N/2^{A-1}$, the letter "A" corresponds to an address of a location in memory bank (X). Moreover, the letter N is equal to the total number of binary increments in bank (X). CPU 10 then determines if each increment has been addressed and stored and, if not, continues its writing operation to store the value of each increment address, sequentially, from highest to lowest. Once the writing operation has been completed, CPU 10 then sequentially reads the address of each increment, from the lowest increment (i.e., $M_{N+1}$ for Bank B) to the highest increment (i.e., $M_{Max}$). For each increment address read by CPU 10, the CPU determines whether or not the address value is equal to stored data at that address. As previously discussed, if an address is real and physically present in the system, the stored value at the address will equal the address value. In the event that an address increment does not physically exist in the system, the increment address will not equal the stored address, and the stored address will (as a result of "wrap around") be the value of the highest physical address actually found within the memory bank. CPU 10 thereby determines the highest memory value physically coupled to the memory bank, and then determines if more memory banks are coupled to bus 12 of the system.

It will be appreciated by one skilled in the art, that although a memory Bank A and a memory Bank B are shown in FIG. 1, that numerous additional memory banks may be coupled to bus 12 using the teachings of the present invention. As illustrated in FIG. 4, the operations illustrated are repeated for subsequent memory banks until the total size of the available memory coupled to the system illustrated in FIG. 1 is determined.

Referring now to FIG. 5, a more detailed discussion of the operation of the present invention using the methods discussed above will be described. As illustrated, a CPU 30 is coupled to a multiplexor 32 and a register 35. Multiplexor 32 is in turn coupled to a bus 36 for communication with a RAM memory situated in one or more memory banks, such as for example, memory Bank A (40) and Bank B (42). Memory Bank A (40) and Bank B (42) correspond to memory Banks A and B in FIG. 1. As previously described, these memory banks are comprised of RAM chips having discrete memory devices of specific size (e.g. 256K bit or 1 Megabit). As in the case of the system illustrated in FIG. 1, the computer system of FIG. 5 delineates each possible storage location for the memory bank by a unique address which, in the case of Bank A, runs from $M_0$ through $M_N$. Similarly, RAM Bank B is comprised of a plurality of memory devices with possible address $M_{N+1}$ through $M_{MAX}$. For purposes of the discussion relative to FIG. 5, the reader is referred to the description of FIGS. 1-4, above, with respect to the sequence of operations which the CPU 30 (or in the case of FIG. 1, CPU 10) execute in order to determine the range of available memory addresses in memory Banks A and B.

Initially, CPU 30 executes the sequence of operations illustrated in FIG. 4 and previously described with respect to FIG. 1, to determine the range of available memory in the computer system. In the presently preferred embodiment, CPU 30 comprises a 32 bit processor which accesses RAM memory locations based on a 32 bit address (#$A_0 \ldots A_{31}$). As is common, the address of a memory location is comprised of the row address and column address of the particular storage location in the RAM memory which is to be accessed. Multiplexor 32 first applies the row address to the RAM which is then followed by a column address in order to complete the memory access cycle (see FIG. 6). Multiplexor 32 is controlled by control logic 45, and is coupled to multiplexor 32 by line 46.

Once CPU has executed a sequence of operations illustrated in FIG. 4, above, a two-bit RAMSIZE variable is set to a binary number between 0 and 4. As illustrated in FIG. 7, the value of the RAMSIZE bits corresponds to the memory capacity of Bank A (possible addresses $M_0$ through $M_N$) as determined by CPU 30 through execution of the sequence of operations illustrated in FIG. 4. The CPU 30 stores the RAMSIZE value in register 35 which, as illustrated, is coupled to control logic 45. Control logic 45 includes a memory having a look-up table (not shown) which maps the RAMSIZE number to a particular address bit provided in the address ($A_0$ through $A_{31}$) by CPU 30 for accessing a RAM location. In the presently preferred embodiment, address bit number 20 ($A_{20}$) corresponds to a 1 Megabyte memory in Bank A. As illustrated in FIG. 7, a 1 Megabit memory size is denoted by a RAMSIZE value of 0. Similarly, a RAMSIZE value of 01 refers to a four megabyte RAM Bank A memory size, and corresponds to address bit $A_{22}$. As illustrated in FIG. 7, in address bit 24 corresponds to a 16 Megabyte memory, and address bit 26 corresponds to a 64 Megabyte memory size.

In operation, the logical state of the address bit identified by the RAMSIZE variable determines which memory bank is selected by control logic 45. For example, if the RAMSIZE variable is equal to 4, then control logic 45 checks the value of address bit $A_{22}$. In the present embodiment, if the value of $A_{22}$ is a logical 0 then Bank A is selected, whereas if the value of $A_{22}$ is a logical 1 then Bank B is selected by control logic 45. Control logic 45 then issues appropriate row address strobe (RAS) and column address strobe (CAS) signals, as is well known, to access a particular memory location in the bank of RAM identified by the logical state of the address bit. It will be appreciated by one skilled in the art that if the RAMSIZE variable is equal to 1, then in accordance with the above discussion, control logic 45 will check the value of address bit $A_{22}$ from CPU 30. Control logic 45 then selects the appropriate memory bank based on the logical state of address bit $A_{22}$.

Accordingly, the present invention, as described above, provides apparatus and methods for use by computer system to determine and allocate the size of the available memory currently in the system. The present invention permits a user to insert or remove memory devices from memory banks without the need of setting switches, providing jumper wires or the like to reconfigure the memory system size. Although the present invention has been described with reference to FIGS. 1-7, and with emphasis on a computer system employing two banks of memory devices, it should be understood that the figures are for illustration only and should not be taken as limitations upon the invention. It is contemplated that many changes and modifications may be made, by one of ordinary skill in the art, to the materials and arrangements of the elements in the invention without departing from the spirit and scope of the invention as disclosed above.

I claim:

1. In a computer system having a central processing unit (CPU) coupled to a memory bank A having a plurality of possible contiguous addresses (#$M_0-M_N$) and a memory bank B having a plurality of possible contiguous addresses (#$M_{N+1}-M_{MAX}$) for storing data, said memory banks configured to receive a plurality of insertable memory devices, each of said devices having a plurality of storage locations identified by corresponding ones of said possible contiguous addresses, said CPU accessing data by providing a multi-bit address of a desired storage location, a method for determining the range of real memory addresses which exist in said memory banks and accessing said desired storage location, comprising the steps of:

dividing said memory banks into N binary increments having boundaries separated by a predetermined number of contiguous possible addresses;

said CPU sequentially storing the address value of each of said increment boundaries at locations corresponding to respective ones of said increment boundary addresses, from the highest possible increment boundary address to the lowest possible increment boundary address, said CPU storing the value of an address which does not physically exist in one of said memory banks at a location corresponding to the highest real address of said one memory bank;

said CPU, for each of said memory banks, sequentially reading each of said locations corresponding to said increment boundary addresses from the lowest possible increment boundary address to the highest possible increment boundary address;

said CPU comparing the address value stored in each of said locations with the respective address of such location such that an increment boundary address is considered to be real if such increment boundary address and said stored address value are equivalent, said highest real increment boundary address being the highest increment boundary address for each of said memory banks in which said stored address value is equivalent to said respective location address;

said CPU providing a bit value corresponding to the total memory size in Bank A to control logic coupled between said CPU and said memory banks; said control logic enabling one of said memory banks based on the logical state of a predefined one address bit of said multi-bit address provided by said CPU, said predefined one address bit identified by said bit value;

said control logic providing control signals to said storage location identified by said multi-bit address provided by said CPU, thereby accessing said desired storage location in said enabled memory bank.

2. The method as defined by claim 2, wherein said multi-bit address comprises 32 bits numbered $A_0$ through $A_{31}$.

3. The method as defined by claim 2, wherein said one predefined address bit is address bit number $A_{20}$ if the memory size of Bank A is 1 megabyte.

4. The method as defined by claim 2, wherein said one predefined address bit is address bit number $A_{22}$ if the memory size of Bank A is 4 megabytes.

5. The method as defined by claim 2, wherein said one predefined address bit is address bit number $A_{24}$ if the memory size of Bank A is 16 megabytes.

6. The method as defined by claim 2, wherein said one predefined address bit is address bit number $A_{26}$ if the memory size of Bank A is 64 megabytes.

7. In a computer system having a central processing unit (CPU) coupled to a memory bank A having a plurality of possible contiguous addresses ($M_0-M_N$) and a memory Bank B having a plurality of possible contiguous addresses ($M_{N+1}-M_{MAX}$) for storing data, said memory banks configured to receive a plurality of insertable memory devices, each of said devices having a plurality of storage locations identified by corresponding ones of said possible contiguous addresses, said CPU accessing data by providing a multi-bit address of a desired storage location, an apparatus for determining the range of real memory addresses which exist in said memory banks, and accessing said desired storage location, comprising:

means coupled to said CPU for addressing said memory banks in N binary increments having boundaries separated by a predetermined number of contiguous possible addresses, said means for addressing sequentially storing the address value of each of said increment boundaries at locations corresponding to respective ones of said increment boundary addresses, from the highest possible increment boundary address to the lowest possible increment boundary address, said CPU storing the value of an address which does not physically exist in one of said memory banks at a location corresponding to the highest real address of said one memory bank;

means coupled to said CPU for reading each of said locations corresponding to said increment boundary addresses for each of said memory banks, from the lowest possible increment boundary address to the highest possible increment boundary address, and comparing the address value stored in each of said locations with the respective address of such location, such that an increment boundary address is considered to be real if such increment boundary address and said stored address value are equivalent, said highest real increment boundary address for each of said memory banks being the highest increment boundary address in which said stored address value is equivalent to said respective location address;

control logic means coupled between said CPU and said memory banks for receiving and storing a bit value corresponding to the total memory size in memory Bank A, said control logic means enabling one of said memory banks based on the logical state of a predefined one address bit of said multi-bit address provided by said CPU, said predefined one address bit identified by said bit value;

said control logic means providing control signals to said enabled memory bank, thereby accessing said desired storage location in said enabled memory bank.

8. The apparatus as defined by claim 7, further including a register coupled between said CPU and said control logic, such that said bit value is stored in said register prior to being provided to said control logic.

9. The apparatus as defined by claim 8, wherein said multi-bit address includes row address bits and column address bits identifying said desired storage location.

10. The apparatus as defined by claim 9, further including a multiplexor coupled between said CPU and said memory banks, said multiplexor being coupled to said control logic.

11. The apparatus as defined by claim 10, wherein said multiplexor alternately couples said row address bits and said column address bits to said memory banks.

12. The apparatus as defined by claim 11, wherein said control logic enables one of said memory banks by coupling a row address strobe (RAS) signal thereto.

13. The apparatus as defined by claim 12, wherein said multi-bit address comprises 32 bits numbered $A_0$ through $A_{31}$.

14. The apparatus as defined by claim 12, wherein said one predefined address bit is address bit number $A_{20}$ if the memory size of Bank A is 1 megabyte.

15. The apparatus as defined by claim 12, wherein said one predefined address bit is address bit number $A_{22}$ if the memory size of Bank A is 4 megabytes.

16. The apparatus as defined by claim 12, wherein said one predefined address bit is address bit number $A_{24}$ if the memory size of Bank A is 16 megabytes.

17. The apparatus as defined by claim 12, wherein said one predefined address bit is address bit number $A_{26}$ if the memory size of Bank A is 64 megabytes.

* * * * *